United States Patent
Ostrover et al.

(10) Patent No.: US 10,326,978 B2
(45) Date of Patent: *Jun. 18, 2019

(54) METHOD AND APPARATUS FOR GENERATING VIRTUAL OR AUGMENTED REALITY PRESENTATIONS WITH 3D AUDIO POSITIONING

(71) Applicant: WARNER BROS. ENTERTAINMENT INC., Burbank, CA (US)

(72) Inventors: Lewis S. Ostrover, Los Angeles, CA (US); Bradley Thomas Collar, Valencia, CA (US)

(73) Assignee: Warner Bros. Entertainment Inc., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/163,819

(22) Filed: May 25, 2016

(65) Prior Publication Data

US 2016/0269712 A1  Sep. 15, 2016

Related U.S. Application Data

(60) Continuation-in-part of application No. 14/303,963, filed on Jun. 13, 2014, now Pat. No. 9,653,119, which
(Continued)

(51) Int. Cl.
*H04N 13/00* (2018.01)
*H04N 13/161* (2018.01)
(Continued)

(52) U.S. Cl.
CPC ........... *H04N 13/161* (2018.05); *H04N 5/76* (2013.01); *H04N 9/802* (2013.01);
(Continued)

(58) Field of Classification Search
None
See application file for complete search history.

(56) References Cited

U.S. PATENT DOCUMENTS 5,530,478 A  6/1996 Sasaki et al.
5,684,714 A  11/1997 Yogeshwar et al.
(Continued)

FOREIGN PATENT DOCUMENTS

WO  2008/038205 A2  3/2008
WO  2010/022633  3/2010

OTHER PUBLICATIONS

International Search Report and Written Opinion dated Aug. 10, 2017 issued in corresponding PCT Application No. PCT/US17/34502.

(Continued)

*Primary Examiner* — Janese Duley
(74) *Attorney, Agent, or Firm* — Gottlieb, Rackman & Reisman, P.C.

(57) ABSTRACT

An apparatus for generating a 3D presentation is described wherein the 3D presentation (that could include a 3D movie, a VR (virtual reality) and/or an AR (augmented reality) content) from original 3D content including original audio and visual components, forming a plurality of scenes, each scene being associated with a respective environment or environments having respective audio characteristics. The original audio components in at least some of the scenes are modified by the apparatus to conform with or compensate for the acoustic characteristics of the respective scene and/or the environment of the location where the presentation is taking place.

21 Claims, 7 Drawing Sheets

Related U.S. Application Data is a division of application No. 13/231,153, filed on Sep. 13, 2011, now Pat. No. 8,755,432, which is a continuation-in-part of application No. 13/173,671, filed on Jun. 30, 2011, now Pat. No. 8,917,774.

(60) Provisional application No. 61/382,204, filed on Sep. 13, 2010, provisional application No. 61/360,088, filed on Jun. 30, 2010.

(51) Int. Cl.

| | | |
|---|---|---|
| *H04S 7/00* | (2006.01) | |
| *H04N 13/117* | (2018.01) | |
| *H04N 5/76* | (2006.01) | |
| *H04N 9/802* | (2006.01) | |
| *G10L 19/008* | (2013.01) | |
| *G11B 20/10* | (2006.01) | |
| *H04N 19/597* | (2014.01) | |

(52) U.S. Cl.
CPC ........... *H04N 13/117* (2018.05); *H04S 7/301* (2013.01); *H04S 7/302* (2013.01); *H04S 7/305* (2013.01); *G10L 19/008* (2013.01); *G11B 2020/10555* (2013.01); *G11B 2020/10592* (2013.01); *H04N 19/597* (2014.11)

(56) References Cited

U.S. PATENT DOCUMENTS

| | | | |
|---|---|---|---|
| 5,990,955 A | 11/1999 | Koz | |
| 6,100,940 A | 8/2000 | Dieterich | |
| 6,466,248 B1 | 10/2002 | Spann et al. | |
| 6,572,475 B1 | 6/2003 | Okabe et al. | |
| 8,290,338 B2 | 10/2012 | Sasaki et al. | |
| 8,306,387 B2 | 11/2012 | Yamashita et al. | |
| 8,363,729 B1 | 1/2013 | Sha et al. | |
| 8,755,432 B2* | 6/2014 | Antonellis | G10L 19/008 369/47.1 |
| 8,831,255 B2* | 9/2014 | Crawford | H04S 7/304 381/17 |
| 9,299,353 B2* | 3/2016 | Sole | G10L 19/008 |
| 9,532,158 B2* | 12/2016 | Lando | H04S 5/005 |
| 9,826,328 B2* | 11/2017 | Mehta | H04S 7/30 |
| 2001/0021220 A1 | 9/2001 | Fert et al. | |
| 2002/0033845 A1 | 3/2002 | Elber et al. | |
| 2002/0085219 A1 | 7/2002 | Ramamoorthy | |
| 2003/0007648 A1* | 1/2003 | Currell | H04S 7/30 381/61 |
| 2003/0012275 A1 | 1/2003 | Boice et al. | |
| 2003/0053680 A1 | 3/2003 | Lin et al. | |
| 2003/0086127 A1 | 5/2003 | Ito et al. | |
| 2003/0184453 A1 | 10/2003 | Hall et al. | |
| 2003/0228063 A1 | 12/2003 | Nakayama et al. | |
| 2004/0054721 A1 | 3/2004 | Pilu et al. | |
| 2004/0111171 A1* | 6/2004 | Jang | H04S 7/30 700/94 |
| 2004/0163123 A1 | 8/2004 | Okada et al. | |
| 2005/0146521 A1 | 7/2005 | Kayle et al. | |
| 2005/0160473 A1 | 7/2005 | Gal-Oz | |
| 2006/0072399 A1 | 4/2006 | Fujimoto et al. | |
| 2006/0115092 A1 | 6/2006 | Toyama et al. | |
| 2006/0129909 A1 | 6/2006 | Butt et al. | |
| 2006/0130112 A1 | 6/2006 | Stewart et al. | |
| 2006/0153295 A1 | 7/2006 | Wang et al. | |
| 2006/0159359 A1 | 7/2006 | Lee | |
| 2006/0210182 A1 | 9/2006 | Kimura | |
| 2007/0005351 A1 | 1/2007 | Sathyendra et al. | |
| 2007/0071345 A1 | 3/2007 | Wang | |
| 2007/0074266 A1 | 3/2007 | Raveendran et al. | |
| 2007/0153914 A1 | 7/2007 | Hannuksela et al. | |
| 2007/0230565 A1 | 10/2007 | Tourapis et al. | |
| 2007/0286277 A1 | 12/2007 | Chen | |
| 2008/0025391 A1 | 1/2008 | Amon et al. | |
| 2008/0091845 A1 | 4/2008 | Mills et al. | |
| 2008/0097763 A1 | 4/2008 | Van De Par et al. | |
| 2008/0123754 A1 | 5/2008 | Ratakonda et al. | |
| 2008/0140426 A1* | 6/2008 | Kim | G10L 19/008 704/500 |
| 2008/0242946 A1 | 10/2008 | Krachman | |
| 2009/0154558 A1 | 6/2009 | Agarwal et al. | |
| 2009/0177479 A1 | 7/2009 | Yoon et al. | |
| 2009/0225829 A2 | 9/2009 | Kwon et al. | |
| 2009/0232207 A1 | 9/2009 | Chen | |
| 2009/0237564 A1* | 9/2009 | Kikinis | H04N 13/0296 348/584 |
| 2009/0238264 A1 | 9/2009 | Wittig et al. | |
| 2009/0267811 A1 | 10/2009 | Tsang | |
| 2009/0315980 A1 | 12/2009 | Jung et al. | |
| 2010/0014584 A1 | 1/2010 | Feder et al. | |
| 2010/0061448 A1 | 3/2010 | Zhou et al. | |
| 2010/0070831 A1 | 3/2010 | Gasanov et al. | |
| 2010/0076577 A1 | 3/2010 | Lee et al. | |
| 2010/0092099 A1 | 4/2010 | Richter | |
| 2010/0131817 A1 | 5/2010 | Kong et al. | |
| 2010/0174541 A1 | 7/2010 | Vos | |
| 2010/0195723 A1 | 8/2010 | Ikai et al. | |
| 2010/0215343 A1 | 8/2010 | Ikeda et al. | |
| 2010/0238267 A1 | 9/2010 | Izzat et al. | |
| 2010/0023634 A1 | 10/2010 | Labonte et al. | |
| 2010/0309975 A1 | 12/2010 | Zhou et al. | |
| 2011/0015765 A1* | 1/2011 | Haughay, Jr. | G06T 13/205 700/94 |
| 2011/0019761 A1 | 1/2011 | Shimada et al. | |
| 2011/0119708 A1 | 5/2011 | Lee et al. | |
| 2011/0164769 A1 | 7/2011 | Zhan et al. | |
| 2011/0200266 A1 | 8/2011 | Fuchie et al. | |
| 2012/0062700 A1 | 3/2012 | Antonellis et al. | |
| 2013/0181901 A1 | 7/2013 | West | |
| 2016/0260441 A1* | 9/2016 | Muehlhausen | G06F 3/011 |
| 2017/0078823 A1* | 3/2017 | Robinson | H04S 7/307 |
| 2017/0287007 A1* | 10/2017 | Du | G06K 9/00671 |

OTHER PUBLICATIONS

An Office Action issued in a related continuation application U.S. Appl. No. 13/205,720 dated Jan. 2, 2013.

"High Quality 3D on Blu-ray is Here . . . ", Technicolor.com., the date of publication is not available. Admitted prior art.

"KDDI Labs demos 3D Virtual Sound Technology", Diginfo.tv, AkihabaraNews Official Partner, the date of publication is not available. Admitted prior art.

Extended European Search Report dated Aug. 17, 2016 issued in corresponding EP Application No. 11825762.5.

Canadian Office Action dated Jun. 21, 2017 issued in corresponding Canadian Application No. 2,844,078.

* cited by examiner

METHOD AND APPARATUS FOR GENERATING VIRTUAL OR AUGMENTED REALITY PRESENTATIONS WITH 3D AUDIO POSITIONING

RELATED APPLICATIONS

This application is a continuation-in-part application to application Ser. No. 14/303,963 filed Jun. 13, 2014 which is a division of U.S. application Ser. No. 13/231,153 filed Sep. 13, 2011 now U.S. Pat. No. 8,755,432, which claims priority to and is a continuation-in-part of application Ser. No. 13/173,671 filed Jun. 30, 2011 now U.S. Pat. No. 8,917,774, claiming priority to U.S. provisional patent application No. 61/382,204 filed Sep. 13, 2010 and U.S. Provisional application 61/360,088 filed Jun. 30, 2010, all incorporated herein by reference in their entirety.

BACKGROUND OF THE INVENTION

A. Field of Invention

The present disclosure relates to the production and configuration of Virtual Reality or Augmented Reality presentations. More particularly, this invention pertains to a method and apparatus for enhancing a Virtual Reality and/or Augmented Reality presentation (hereafter referred to as a 'VR/AR presentation') by using 3D space information associated with at least some of the visual characters and other objects of interest that are either part of the actively viewed scene, or outside the field of view, to position the associated audio characters/objects of interest (hereafter referred to as 'audio objects' or 'audio objects of interest') in the 3D space of the VR/AR presentations. Moreover the apparatus and method further provides for the augmentation of audio objects using characteristics of the visual environment for the VR presentations and the characteristics of actual environments for the AR presentations.

B. Description of the Prior Art

In the past, a 3D movie or other similar episodic audio/visual content was prepared for analog film distribution or other relatively low fidelity analog or digital transmission, storage, projection and/or display 3D formats, e.g. anaglyph 3D. Advances in 3D encoding formats, presentation technology, and digital signal processing have resulted in 3D movie or episodic visual content produced in much higher quality 3D formats, e.g., stereoscopic HD 1920×1080p, 3D Blu-ray Discs, etc.

"Virtual Reality" is a term that has been used for various types of content that simulates immersion in a partially or wholly computer-generated and/or live action three-dimensional world. Such content may include, for example, various video games and animated film content. A variation of these technologies is sometimes called "Augmented Reality." In an Augmented Reality presentation, an actual 3D presentation of the current surroundings of a user that is 'augmented' by the addition of one or more virtual objects or overlays. Augmented Reality content may be as simple as textual 'heads up' information about objects or people visible around the user, or as complex as transforming the entire appearance of the user's surroundings into an imaginary environment that corresponds to the user's real surroundings. Advances in encoding formats, presentation technology, motion tracking, position tracking, eye tracking, portable accelerometer and gyroscopic output/input, and related signal processing have reached a point where both virtual and augmented reality presentations can be displayed to a user in real time.

Virtual Reality (VR) and Augmented Reality (AR) have been implemented in various types of immersive video stereoscopic presentation techniques including, for example, stereoscopic VR headsets. As mentioned above, 3D headsets and other 3D presentation devices immerse the user in a 3D scene. Lenses in the headset enable the user to focus on a lightweight split display screen mounted in the headset positioned inches from the user's eyes. In some headset types, different sides of the split display show right and left stereoscopic views of video content, while the user's peripheral view is blocked or left partially unobstructed below the central field of view. In another type of headset, two separate displays are used to show different images to the user's left eye and right eye respectively. In another type of headset, the field of view of the display encompasses the full field of view of each eye including the peripheral view. In another type of headset, in order to achieve either AR or VR, an image is projected on the user's retina using controllable small lasers, mirrors or lenses. Either way, the headset enables the user to experience the displayed VR or AR content in a manner that makes the user feel like he was immersed in a real scene. Moreover, in the case of AR content, the user may experience the augmented content as if it were a part of, or placed in, an augmented real scene. VR or AR content can be presented to a viewer as a 360° picture as well that can be presented on a standard screen with the image moving left or right and/or up and down either automatically or under the control of the viewer.

The immersive AR/VR effects may be provided or enhanced by motion sensors in a headset (or elsewhere) that detect motion of the user's head, and adjust the video display(s) accordingly. By turning his head to the side, the user can see the VR or AR scene off to the side; by turning his head up or down, the user can look up or down in the VR or AR scene. The headset (or other device) may also include tracking sensors that detect position of the user's head and/or body, and adjust the video display(s) accordingly. By leaning or turning, the user can see a VR or AR scene from a different point of view. This responsiveness to head movement, head position and body position greatly enhances the immersive effect achievable by the headset. The user may thus be provided with the impression of being placed inside or 'immersed' in the VR scene. As used herein, "immersive" generally encompasses both VR and AR presentations.

Immersive headsets and other wearable immersive output devices are especially useful for game play of various types, which involve user exploration of a modeled environment generated by a rendering engine as the user controls one or more virtual camera(s) or displays using head movement, the position or orientation of the user's body, head, eye, hands, fingers, feet, or other body parts, and/or other inputs using sensors such as accelerometers, altimeters, GPS receivers, Electronic Tape Measures, Laser Distance Finders, laser[[,]] or sound Digital Measuring Devices, gyroscopic sensors and so on. To provide an immersive experience, the user needs to perceive a freedom of movement that is in some way analogous to human visual and aural perception when interacting with reality.

Content produced for VR/AR presentations can provide this experience using techniques for real-time rendering that have been developed for various types of video games. The content may be designed as a three-dimensional computer model with defined boundaries and rules for rendering the content as a video signal. This content can be enhanced by stereoscopic techniques to provide stereoscopic video output, sometimes referred to as "3D," and associated with a VR/AR presentation that manages the rendering process in response to movement of the 3D headset, or head, eye, hand, finger, foot or other body part (or body part appendage such as a 'magic' wand or golf club) movement, and/or other inputs such as the sensors mentioned above to produce a resulting digital VR/AR presentation and user experience. The user experience can be very much like being placed or immersed inside a rendered video game environment.

In other types of VR/AR presentations, the simulated 3D environment may be used primarily to tell a story, more like traditional theater or cinema. In these types of presentation, the added visual effects may enhance the depth and richness of the story's narrative elements or special effects, without giving the user full control (or any control) over the narrative itself. However, a rich mixed reality experience is provided that progresses differently during each encounter (or viewing), as opposed to a standard linear book or movie wherein a set narrative or sequence of scenes is presented having a single ending. This experience depends upon direction from the viewer which way to look, for example, though clearly this can be influenced and directed by narrative cues, as well some random elements that may be introduced by the software. As a result, the narrative is not linear or [[ ]] predictable at the outset but variable due, for example to choices made by the viewer and other factors. In other words, as a joint result of viewer choices and other factors in concert with the mixed reality environment, the narrative or story being presented can evolve dramatically on the fly, creating tension and release, surprises, linear or non-linear progress, turning points, or dead ends. These considerations are especially applicable to unscripted presentations which in some sense have variable, dynamically changing sequences similar to games or live reality shows. It is especially important for these kinds of presentations to insure that both the audio and visual signals are as realistic as possible so that the presentations appear realistic and not fake or artificial.

In the present application, the term 'digital VR/AR presentation' is used to refer to videogame, movie, episodic, or other audiovisual content recorded, produced, rendered, and/or otherwise generated in a digital format, or audiovisual content recorded, produced, rendered or otherwise generated in a digital format to be overlaid on reality. The term also covers content produced in 2D, content produced in 2D and then post-produced from 2D to 3D, content produced natively in 3D, as well as content rendered from 3D animation systems.

When a digital VR/AR presentation is prepared for distribution in some format or distribution channel, there may be relevant 3D visual information determined by analysis software and/or by an operator on a frame by frame, group of frames, or scene by scene basis and recorded in a respective log.

The conventional method of representing 3D depth information is via a z-axis depth map, which consists of a single 2-dimensional image that has the same spatial resolution as the 3D imagery (e.g. 1920×1080 for HD video). Each pixel of the image contains a gray-scale value corresponding to the depth of that particular pixel in the scene. For example, for an 8-bit data representation a gray-scale value of 256 (pure white) could represent the maximum positive 3D parallax (into the screen), while a value of 0 (pure black) could represent the maximum negative parallax (out of the screen). The values can then be normalized based on the depth budget of the scene, e.g. a value of 256 could represent a pixel that is 100 feet away from the viewer whereas a value of 0 could represent a pixel which is 10 feet away from the viewer. Another possible data representation of 3D depth information is a 3-dimensional depth volume, whereby each pixel in the 3D volume of the scene is represented by a particular value. Unlike the z-axis depth map the 3D depth volume is not limited to a single gray-scale value, and instead for each pixel both the color value (i.e. RGB value) of that particular pixel as well as the x-y-z coordinate of that pixel can be represented. Computer generated 3D imagery or other 3D visual effects techniques may more easily lend themselves to creating 3D depth volumes versus utilizing a 2D z-axis depth map. Such 3D representations of the depth information could be used for future display systems including holographic projection. Other data representations can be used to represent the depth information in a given scene including, but not limited to, 2D disparity maps and eigenvectors.

As part of generating an VR/AR presentation, a 3D space map of the frames' visual content can be generated, or of objects of interest within frames, may be determined when preparing to position subtitles or other graphics in 3D space over the background video.

Some audio objects of interest could have on-screen visual counterparts that can be tracked spatially. For example, as an on-screen actor moves and speaks in a scene, his position can be tracked both audially and visually. For example, there are visual object-tracking software systems and software development kits (such as the SentiSight 3.0 kit of Neurotechnology, Vilnius, Latvia) that can detect and recognize visual objects within a scene and identify their specific locations. Such systems can tolerate in-plane rotation, some out-of-plane rotation, and a wide range of changes in scale. Such systems can also manage to track visual or audio objects that are occluded (e.g., as much as 50%). If motion vectors were to be used to plot the trajectory of objects that are either occluded to a greater degree, or even fully occluded visually, then object tracking could also identify locations of off-screen objects given sufficient, prior on-screen information, or even post on-screen info for pre-authored sequences. Other audio objects of interest, e.g., an actor speaking while off screen, or an actor speaking while being partially or fully occluded visually, may not be tracked. In this latter case, an on-screen actor might look directly across and past the screen plane boundary at another off-screen actor with whom he converses. Other audio objects of interest may not correspond to on screen visual objects at all depending upon positioning or editorial intent, e.g., an off-screen narrator's voice may be essential to a presentation, but there may be no on-screen item that corresponds to that voice.

However, in some instances during the preparation of a digital VR/AR presentation its audio component or parts of the audio components relating to audio objects of interest may not include clear 3D space perception cues, either because these cues have been stripped away or otherwise lost, or because they were missing in the first place. This problem is compounded in real-time applications and environments such as video game rendering and live event broadcasting.

Just as there is a need to provide the audio component with cues for 3D space perception to enhance a digital VR/AR presentation, there is also a need to include such cues in the audio components of digital VR/AR presentations in other formats. However, presently the preparation of digital VR/AR presentations for release in one format does not include an efficient conversion of the audio component that insures the presence or preservation of the 3D space perception audio cues in the digital VR/AR presentation released in an additional format.

Therefore, an efficient scheme to optimize digital VR/AR presentation preparation with audio 3D space perception cues is required. In addition, an efficient scheme to optimize additional digital VR/AR presentation conversion with audio 3D space perception cues for other formats or distribution formats is required. In both cases, information gathered in digital 3D video analysis is used as input to produce audio 3D space perception cues to enhance the 3D audio-visual experience.

Another problem arises in that currently a separate 2D version of the audio component, without 3D space perception cues, may be distributed for viewing of the content in 2D if the otherwise digital VR/AR presentation is to be viewed in 2D, e.g. if there is no digital VR/AR presentation system available, i.e. no VR/AR relevant headset and/or no 3D display. Therefore, the data created in the course of encoding the audio 3D space perception cues can be saved and included with the digital VR/AR presentation release file so that 3D-to-2D down-mixing can be managed downstream.

Audio and video both largely create the VR/AR presentations and resulting experiences at issue. {Here we are not concerned with so-called "4D" theatrical presentations wherein aromas and/or moving seats, and/or water (e.g. 'rain') dispensers etc. are used to enhance the otherwise normal theatrical presentation.} So, a VR/AR presentation will be enhanced, and therefore the user experience will be more enveloping and powerful, if audio cues related to the position of objects of interest in the VR/AR presentation complement the video, as relevant audio cues underscore the visual position of objects of interest in real life, e.g. a fire engine racing by in one's visual field, preceded by its siren first at low amplitude and relatively low pitch when it is far away, then louder and higher pitched as it arrives, then fading away in amplitude and pitch as it passes into the distance, with the apparent sound source rising upward as the fire engine exits the shot driving up a hill.

The formats for the audio component of digital VR/AR presentations can vary in terms of production, encoding, transmission, generation, and/or presentation. Typical presentation formats for the audio component may vary from mono to stereo to multi-channel such as 5.1, 6.1, 7.1 or so-called 'object oriented' or 'immersive' audio. Some of these audio formats include audio cues for depth perception such as amplitude differences, phase differences, arrival time differences, reverberant vs. direct sound source level ratios, tonal balance shifts, masking, and/or surround or multi-channel directionality. These cues can be tailored in light of video object spatial position data to enhance the presentation of a digital VR/AR presentation so that audio 3D space perception in X, Y and Z axes complements visual 3D space perception. In this manner, a digital VR/AR presentation looks and 'feels' more realistic if the 3D position of a visual object of interest and associated audio are coincident.

It would be desirable, therefore, to develop methods and apparatus that not only provide audio tracks indicative of the position of objects of interest in VR/AR presentations but also adjust the audio tracks to better match the environments in which the objects are placed to enhance the appeal and enjoyment of VR and AR content for more immersive VR/AR presentations.

SUMMARY OF THE INVENTION

An apparatus for generating a 3D presentation is described wherein the 3D presentation (that could include a 3D movie, a VR (virtual reality) and/or an AR (augmented reality) content) from original 3D content including original audio and visual components, forming a plurality of scenes, each scene being associated with a respective environment having respective audio characteristics. The original audio components in at least some of the scenes are modified by the apparatus to conform with or compensate for the acoustic characteristics of the respective scene and/or the environment of the location where the presentation is taking place.

More particularly, an apparatus for generating a 3D presentation from content having original audio and visual components, said content including a plurality of scenes, each scene being associated with a respective environment having audio characteristics, the apparatus includes an audio processor receiving said audio components and environmental parameters indicative of said respective environment, said audio processor being configured to modify said original audio components into modified audio components based on said environmental parameters; an authoring tool receiving said modified audio components and said original video components and generating corresponding encoding coefficients; and an encoder receiving said original video components and said modified audio components and generating encoded content based on said encoding coefficients.

When, the 3D presentation is presented in a theater having theater acoustic parameters, the apparatus includes an acoustic memory storing said theater acoustic parameters and said audio processor being configured to receive said theater acoustic parameters to generate said modified audio components. In addition, an acoustic environment sensor may be provided that is adapted to sense said theater acoustic parameters, signals sensed by said acoustic environment sensor being stored in said acoustic memory.

In one embodiment, the encoder is configured to generate VR (virtual reality) encoded content for presentation on a VR device, wherein said video components define at least a first virtual scene with a virtual environment having virtual acoustic environment characteristics, and wherein said audio processor is configured to receive said virtual acoustical environment characteristics and to generate coefficients defining audio tracks configured for said virtual scene.

In this embodiment, the apparatus may include an environment analyzer configured to analyze the VR environment defined in said first virtual scene, said environment analyzer generating said virtual environment acoustics for storing in said acoustic memory.

In one embodiment, the encoder is configured to generate AR (augmented reality) encoded content based on received content and content obtained from a current environment for presentation on an AR device, wherein said video components define at least a first AR scene including virtual and real elements and said audio processor is configured to receive virtual and real audio components and acoustic characteristics of said first AR scene, said audio processor generating coefficients descriptive audio signals configured to match the acoustic characteristics of said first AR scene.

In one embodiment, the audio processor generates coefficients descriptive of audio signals including environment signals associated with said first AR scene.

In one embodiment, the apparatus includes a real environment detector detecting a real environment associated with a current position of a viewer and an acoustic environment detector configured to determine acoustic parameters of said real environment. For example, the real environment detector includes a GPS or a camera adapted to create images associated with the current position and an analyzer analyzing said images to determine said acoustic parameters.

In one embodiment, the real environment detector includes a sound generator generating a test signal and a microphone arranged to detect echoed sounds originating from said sound detector, said acoustic environment detector being adapted to analyze said echoed sounds.

In another aspect of the invention, a method is described for generating an encoded 3D presentation. The method includes receiving 3D content having several 3D scenes and including audio and visual tracks; determining acoustical characteristics of one of a local environment where said 3D presentation is presented and a virtual location of one of said 3D scenes; modifying said audio tracks to generate modified tracks based on said acoustical characteristics; encoding said 3D content using encoding coefficients at least in part dependent on said audio spatial parameter to generate an encoded 3D presentation, said encoded 3D presentation including visual components and audio components, the audio components being derived from said modified sound track.

The 3D presentation can be presented in a theater and said step of determining includes determining the acoustic characteristics of said theater.

The 3D presentation can be a VR presentation for a viewer using a personal VR device, and said step of determining includes determining virtual acoustic characteristics of a virtual scene in said 3D presentation. The step of modifying said audio tracks can include adding additional sounds to said audio tracks, said additional sounds being associated with an acoustic environment associated with said virtual scene.

The 3D presentation can be an AR presentation for a viewer using a personal AR device, said AR presentation including AR scenes with virtual and real scene elements. In this case, the step of determining including determining virtual acoustic characteristics of said virtual scene elements. Alternatively, the step of determining includes determining real acoustic characteristics of said real scene elements.

The step of modifying said audio tracks could include adding additional sounds to said audio tracks, said additional sounds being associated with an acoustic environment associated with said virtual scene element.

The step of modifying said audio tracks could include adding additional sounds to said audio tracks, said additional sounds being associated with an acoustic environment associated with said real scene element.

DETAILED DESCRIPTION OF THE PREFERRED EMBODIMENT

Figure 1A:
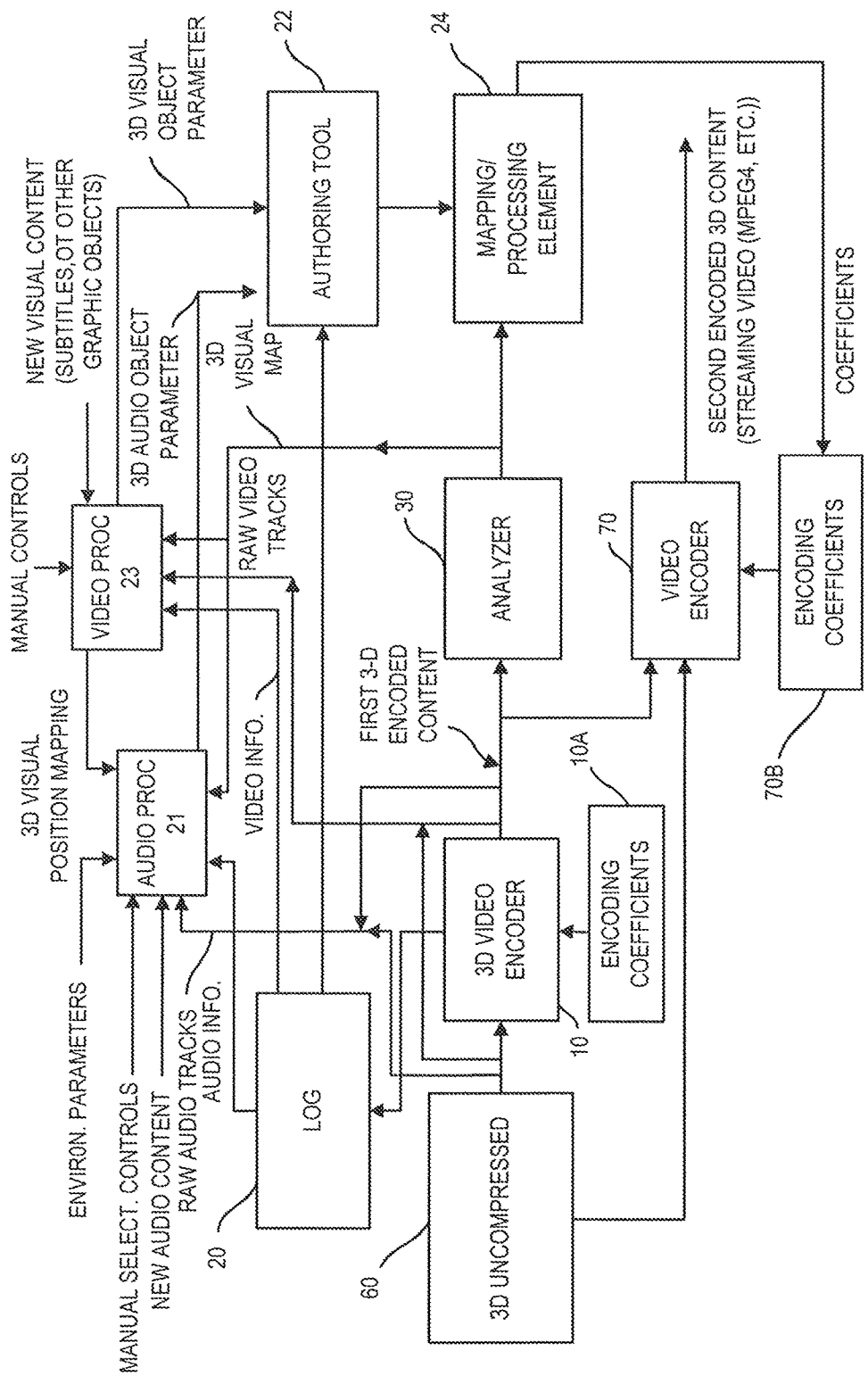
FIG. 1A shows a block diagram of an apparatus constructed in accordance with this invention.

The present invention provides a solution for the above-described problems. The solutions are presented herein as an improvement to the apparatus disclosed in commonly assigned U.S. Pat. No. 8,755,432 entitled METHOD AND APPARATUS FOR GENERATING 3D AUDIO POSITIONING USING DYNAMICALLY OPTIMIZED AUDIO 3D SPACE PERCEPTION CUES incorporated herein its entirety, it being understood that the invention can be implemented using other devices as well.

FIG. 1 shows the components of an apparatus for implementing the invention. Content, such as an uncompressed 3D content 60 is first presented to the apparatus for processing. In this application, the term "3D" content is used to refer generically to content that can be presented on a suitable 3D apparatus and could include a 3D presentation, a VR presentation or an AR presentation.

A 3D presentation is presentation, such as a movie, which consists of a plurality of 3D images presented in a predetermined sequence with no interaction or input from a spectator, and accompanied by a suitable 3D sound track. For example, the digital 3D movie could be a sequence of 3D frames at the same native resolution as the source material (e.g., 1920×1080p). In other words, a 3D movie could be a feature movie shot with live actors, or could be a cartoon with virtual characters, or a mixture, or live action supplemented by CGI effects. Importantly, as presently envisioned, a 3D presentation is shown either to a single viewer, or a plurality of viewers simultaneously, for example, in a movie theater and the final audio component is presented to the viewers through the audio speaker system of the movie theater.

A VR presentation refers to a presentation, such as an interactive game in which various scenes are played in sequences determined by viewer actions, including eye tracking or focus, gestures or other body/limb movements, positioning of appendages such as a 'magic' wand or gold club, object or face recognition software, or motion tracking or depth sensing inputs provided by an appropriate VR device such as a Head Mounted Display (HMD) having audio outputs for stereo or multichannel audio and a screen presenting 3D images to a user. The audio component ca be presented through headphones or ear buds. The 3D images are presented in a sequence determined by a spectator and a suitable 3D audio track is generated to suit the visual sequence. The 3D images may be real images of actual objects, scenes, etc. or may be virtual images generated using well known microprocessor-based techniques. A VR presentation could be an interactive game in which various scenes are played in sequences determined by viewer actions, including eye tracking or focus, gestures or other body/limb movements, positioning of appendages such as a 'magic' wand or gold club, object or face recognition software, or motion tracking or depth sensing inputs provided by apparatus in a Head Mounted Display (HMD). The final video components of the VR presentation are shown on the screen of the VR device (not shown) and the audio components are presented through standard audio devices such as the head phones or earbuds (not shown).

AR presentations are similar to VR presentations and consist of images of real time objects that a spectator is looking at and which images are combined with other 3D images that are superimposed or otherwise combined with the real time images. The other 3D images may be, for example, real 3D images taken previously, or computer generated images. Real objects, such as walls, or other obstacles are detected using various sensors or optical recognition elements. The proximity or changes in proximity to surrounding objects are determined by accelerometers, altimeters, GPS receivers, Electronic Tape Measures, Laser Distance Finders, laser or sound Digital Measuring Devices, or gyroscopic sensors. Again, the AR presentations include audio and video components with the audio components being played through headphones or similar means and the video components being presented on a screen.

Typically, in each 3D frame, planes and/or objects of visual interest correspond to audio objects of interest. For example, in one instance an on-screen actor can be speaking a main dialog. In this case, the audio object of interest—the main dialog and the actor have the 3D spatial location. In another case, audio objects of interest may not correspond to visual objects of interest. For example, a narrator or commentator who is on- or off-screen can provide editorial dialog of a car race. The various cars in the race can emerge rapidly from the background, roar closer and closer, and then zoom past the viewer off screen. In this case, the visual objects of interest are the cars and there are two sets of audio objects of interest: the editorial dialog and the sound of the zooming cars. In this case, to make the scene look and feel dramatic, both the sounds of the racing cars and the editorial dialog should be provided as audio objects of interest. During the scene, the car sounds (e.g., the audio objects) and visual images (e.g., the visual objects) move closer and closer to the viewer but do not mask the editorial dialog. In another case, for example, in a video game, visual objects may pop in and out of the scene in a pseudorandom manner and various sound effects may be associated with some of these objects, or randomly spaced audio objects may be produced. Importantly, as discussed in more detail below, the audio track generated herein includes not only standard audio elements such speech, sound effects, etc., but these elements are modified and new elements are added that conform to characteristics of the virtual environment of the scene being played, and, in some cases the physical environment of the viewer(s).

As discussed above, the 3D content may include a Z-axis depth map indicating relative distance of various visual objects (or planes of interest, e.g. in A/R one plane for real world objects and one place for A/R overlays) for the respective 3D frames. Conventionally, a 3D Z-axis depth map consists of a two dimensional image having the general outline and surface characteristics of all the objects of interest. Objects, and object surfaces, at various locations along the Z-axis are represented on the two dimensional image by their respective outlines and surface shadings. Each outline includes one or more surfaces the surfaces being shaded. More particularly, each outline and each surface of the outline (if more than one) is shaded on a gray scale corresponding to the relative position of the respective objects and their surfaces. Thus, a 3D Z-axis depth map provides information about the relative positions of various objects of interest, and their surfaces, with respect to each other and with respect to a particular reference point such as the screen and/or the viewer. Of course, as discussed above, other means of indicating the positions of audio or visual objects in 3D space may be used and this invention is not limited to any one of these means.

Referring now to FIG. 1A, in the system in accordance with this invention an encoder 10 receives a 3D movie, for example in the form of an uncompressed video master 60. The audio/video encoder 10 generates from this master a first 3D encoded content which may be stored, recorded or distributed to customers via various distribution channels. The first 3D encoded content may or may not have information providing audio 3D space perception cues relative to the 3D space visual objects, or any other audio objects of interest. It does not have audio 3D information defining the acoustic environment in which the master will be played and/or the virtual environment in which the scenes take place.

As shown in FIG. 1A, the apparatus for implementing the invention includes a 3D video encoder 10, an audio processor 21, a video processor 23 and an authoring tool 22. The 3D content 60 is presented to the 3D video encoder that processes the 3D content. The output of the encoder 10 is referred to as the first 3D encoded content.

The video processor 23 received a 3D video tracking map such as a 3D Z-axis map described above that tracks the positions of visual objects of interest for each frame or groups of frames for encoded content. The 3D tracking map can be derived from a log 20, or by analyzing the first 3D encoded content using analyzer 30. In addition, the video processor 23 may also receive manual controls for controlling the positions of some of the visual objects. Furthermore, new visual content may also be provided to the video processor, in A/R instantiations for example, by static or changing proximity to surrounding objects determined by object recognition or face recognition software, or motion tracking or depth sensing means included in a HMD, e.g. computer vision, accelerometers, altimeters, GPS receivers, Electronic Tape Measures, Laser Distance Finders, laser or sound Digital Measuring Devices, or gyroscopic sensors. New visual content may be provided to the video processor in the form of subtitles and/or other additional graphic elements (as described more fully in commonly assigned co-pending application Ser. No. 13/205,720 filed Aug. 9, 2011, entitled METHOD AND APPARATUS FOR GENERATING ENCODED CONTENT USING DYNAMICALLY OPTIMIZED CONVERSTION FOR 3D MOVIES-incorporated herein by reference). The visual processor generates visual parameters that are provided to the authoring tool 22. The authoring tool can either work in real time, e.g. for a videogame, A/R, or V/R rendering purposes or performs its functions before the rendering, for example for 3D presentations.

The audio processor 21 receives the raw audio signals (e.g., the audio tracks from the uncompressed video master) and/or other sources. For example, additional audio content may be added that was not in the original uncompressed video master. The audio processor 21 receives other information, such as the 3D position of various visual objects, manual and/or automated selection signals correlating certain audio tracks with either visual objects or defining audio objects (if the audio tracks either are not associated with a visual object, or are associated with an off-screen visual object). Importantly, the audio processor 21 also receives other environmental parameters indicative of the respective environment as described in more detail below. The audio processor 21 then generates audio parameters indicative of the position of the audio content, such as audio objects of interest in the relevant frames. As shown in more detail in FIG. 1B, audio processor 21 include comparator 100 receiving the 3D video and audio tracking maps. The audio source (i.e., the audio object of interest) can be positioned in 2D and 3D space, i.e. along the X, Y and Z axes. For various editorial, or other reasons, the audio source position in the X, Y and Z axes may be important. Various criteria or approaches can be used to generate and/or identify the positions of audio objects, as discussed in more detail below. Once these positions are selected, then the authoring tool 22 analyzes the audio object parameters, and for each frame or set of frames, allocates the position of the audio object(s) and then generates appropriate authoring or re-authoring control signals for processing the audio source(s) in the 3D frames with cues to position them in the designated location(s).

For AR, an evolving visual tracking map or maps can be generated from motion tracking or depth sensing means included in a HMD such as computer vision, object or face recognition software, accelerometers, altimeters, GPS receivers, Electronic Tape Measures, Laser Distance Finders, laser or sound Digital Measuring Devices, or gyroscopic sensors. The tracking map can be used to produce an AR overlay or other blending of AR objects or graphics with real world objects, including audio positioning.

Figure 1B:
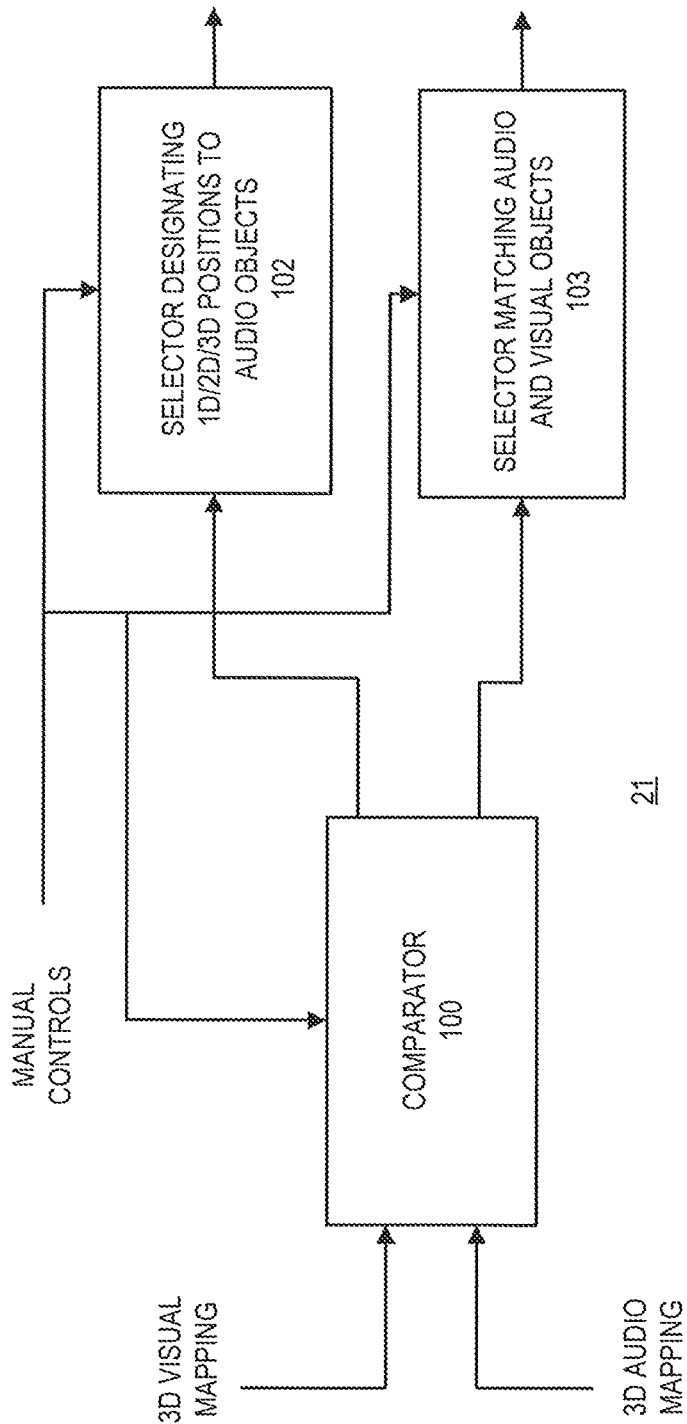
FIG. 1B shows a block diagram of the audio processor.

In some instances, the audio and visual positions of the objects of interest correspond, the 3D space information for both the audio and the visual objects is recorded so that audio objects can be mapped on to the visual objects of interest. In one embodiment of the invention, only the depth positions (e.g., the positions along the Z-axis) are provided. In another embodiment, the positions of the audio objects in 3D volume (e.g., along all three axes X, Y and Z) are provided separately from the position of any visual object. Referring to FIG. 1B, the comparator 100 receives the audio and visual tracking maps and determines if they are convergent. If there is a single visual object and a single audio present, this determination can be simple. However, if there are multiple visual and multiple audio objects present, manual controls or other means may be used to assign each audio object to each visual object. Once this identification is done, automated tracking software is provided to track the audio and visual objects consistently by component 103.

In other instances, the audio and visual objects of interest diverge, or no information is available that is indicative of whether an audio object maps to a particular visual object of interest. In this case, either a manual operator, or an automated analyzer running automatic object audio tracking software (if necessary) represented by component 102 can select and track the 'on-screen' audio object(s) of interest (as well as any visual objects A, B, C, or D.) This tracking information may be represented, for example, as a Z-axis depth map (if only depth perception is desired), or it may be represented in full 3D space along the X, Y and Z axes. If there are no audio objects of interest on screen or an audio object is obscured (e.g. an actor speaking from behind a closed door), or if an off screen virtual object has a known or plotted position, then the tracking map is extended to provide information for the occluded or off-screen audio object as well, including an audio object disposed in the same vertical plane as the viewer, or even behind the viewer.

Figure 2:
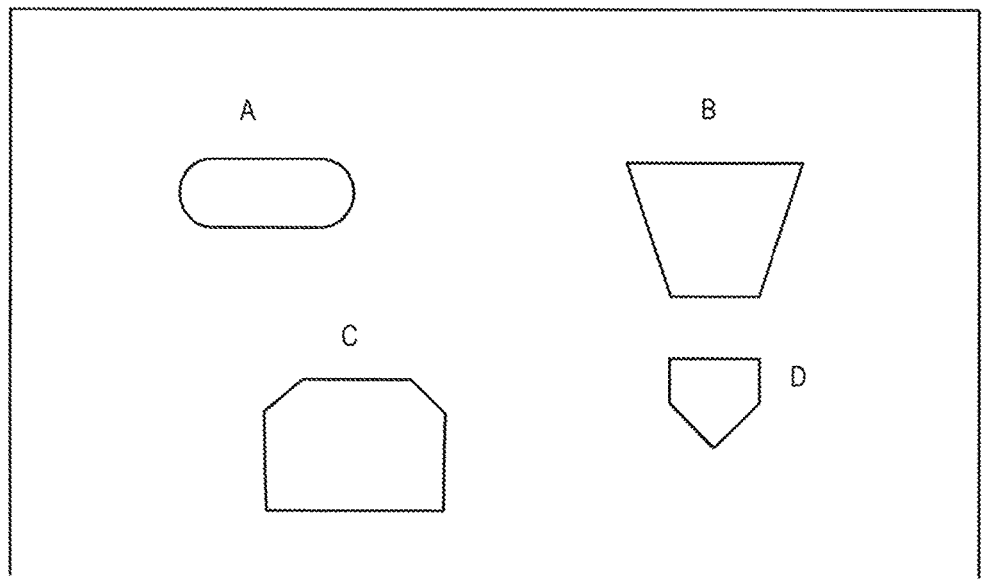
FIGS. 2-4 show several plan views (in the X-Z axis) of several 3D frames with several audio and visual objects of interest.
Figure 2:
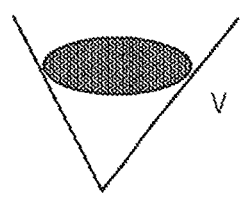
Figure 3:
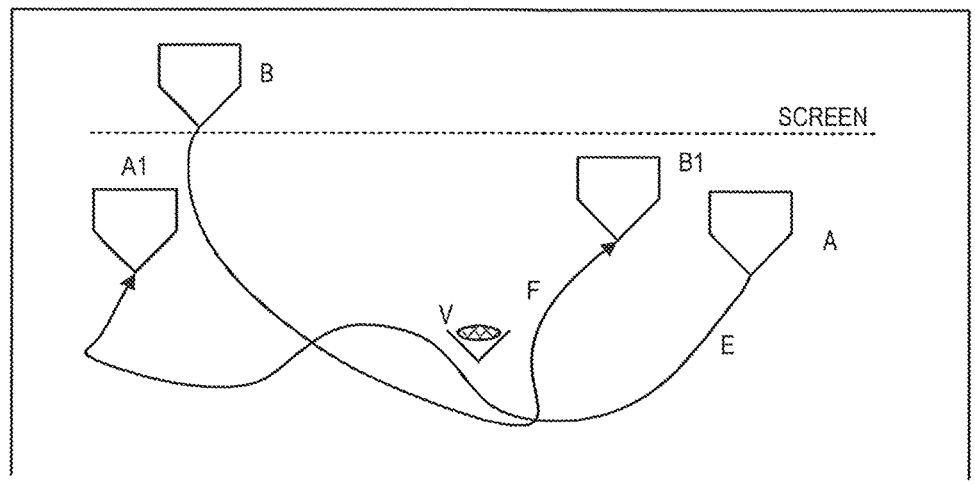
Figure 4:
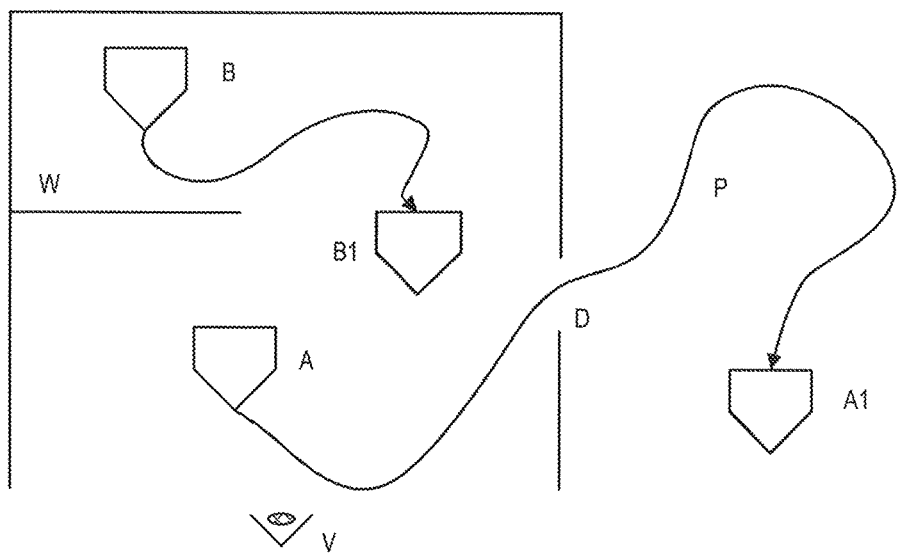

FIGS. 2-4 provide in plan views some simple examples illustrating various audio and visual objects of interest in a scene. FIG. 2 shows a plan view of a stage with four performers A, B, C, D as seen by a viewer V. A, B, C and D may be vocalists and/or musicians and they can remain stationary or move about the stage. Initially, the video component of the received 3D movie shows the positions of each of the performers. The audio component consist of either a mixed audio track, or several tracks with the audio signals from each of the performers, in this case with substantially no audio depth perception or any other audio cues tying the tracks spatially to the performers. The audio component further lacks any acoustic characteristics of the desired environment, e.g., the environment in which the respective scene takes place.

If separate tracks are not available, then the raw audio tracks are analyzed and manipulated by the audio processor (comparator 100 or component 102) to generate audio parameters defining virtual audio tracks representing the sounds from each of the performers. The tracks are then correlated with each of the performers. This can be done either manually by an operator or automatically, for example, by processing the video component to identify the four performers using facial recognition algorithms, by recognizing their instruments, or other means.

Once the positions of the performers are identified or correlated with the respective tracks, audio parameters are generated by the audio processor 21 representing the audio objects of interest. In a preferred embodiment, these parameters represent depth perception cues for some or for all the audio tracks. If desired, the positions of some of the performers are emphasized in some scenes and the positions of other performers can be emphasized at other times, based for example, on the relative loudness of the tracks, or other editorial criteria. Importantly, the audio processor also receives the environmental parameters defining the acoustical characteristics of the respective environment and modulates the each of the audio tracks accordingly. So, if the scene takes place in a forest, the audio tracks are modified so that a viewer looking and listening to the program not only hears the sound tracks in a manner in which the sounds would be heard in a forest, but would hear additional sounds, such as chirping of birds, buzzing of bees, and so on. These sound effects (the term "sound effect" is used herein to refer to the modificaitons of the sounds and the addition of new sounds) thus provide a true 3D experience to the viewer.

As mentioned above, if the performers move around, their positions are tracked and the audio object positions corresponding to the audio objects of interest are recorded so that the audio tracks corresponding to these objects can be processed with appropriate audio position cues to position them in 3D space. The quality of the sound tracks are also modified according to the position of the audio objects as well.

FIG. 3 shows a plan view of a different scene in which two actors A and B are talking and moving around along paths E and F so that actor A ends up in position A1 and actor B ends up in position B1. At one point, one or both of the actors A and B are positioned 'off stage' behind the viewer V. All the positions are tracked and/or plotted from the video component object tracking map and corresponding audio object tracks are processed with 3D space position cues to correspond to these positions by component 103. The resultant audio track also include modifications to render them more realistic, in accordance with the acoustic environment of the location where the scene takes place.

FIG. 4 shows a plan view of a scene somewhat similar to the one in FIG. 3. In this scene, originally, actor B is behind a wall W (or other obstruction) but he can still be heard as he speaks. Actor A is visible, and is talking to B. During the conversation, actor B moves around the wall W and forward toward position B1. Meanwhile, or later, actor A walks through a doorway D so that he is no longer visible, but may move along an arbitrary path P, and still keeps on talking. As the two actors are moving around and talking, their positions are constantly tracked and plotted, so appropriate audio 3D space cues can be generated even if an actor is out of sight, e.g., off stage. (Obviously, FIG. 4 is not to scale since viewer V is normally much further away from the stage.)

Figure 5:
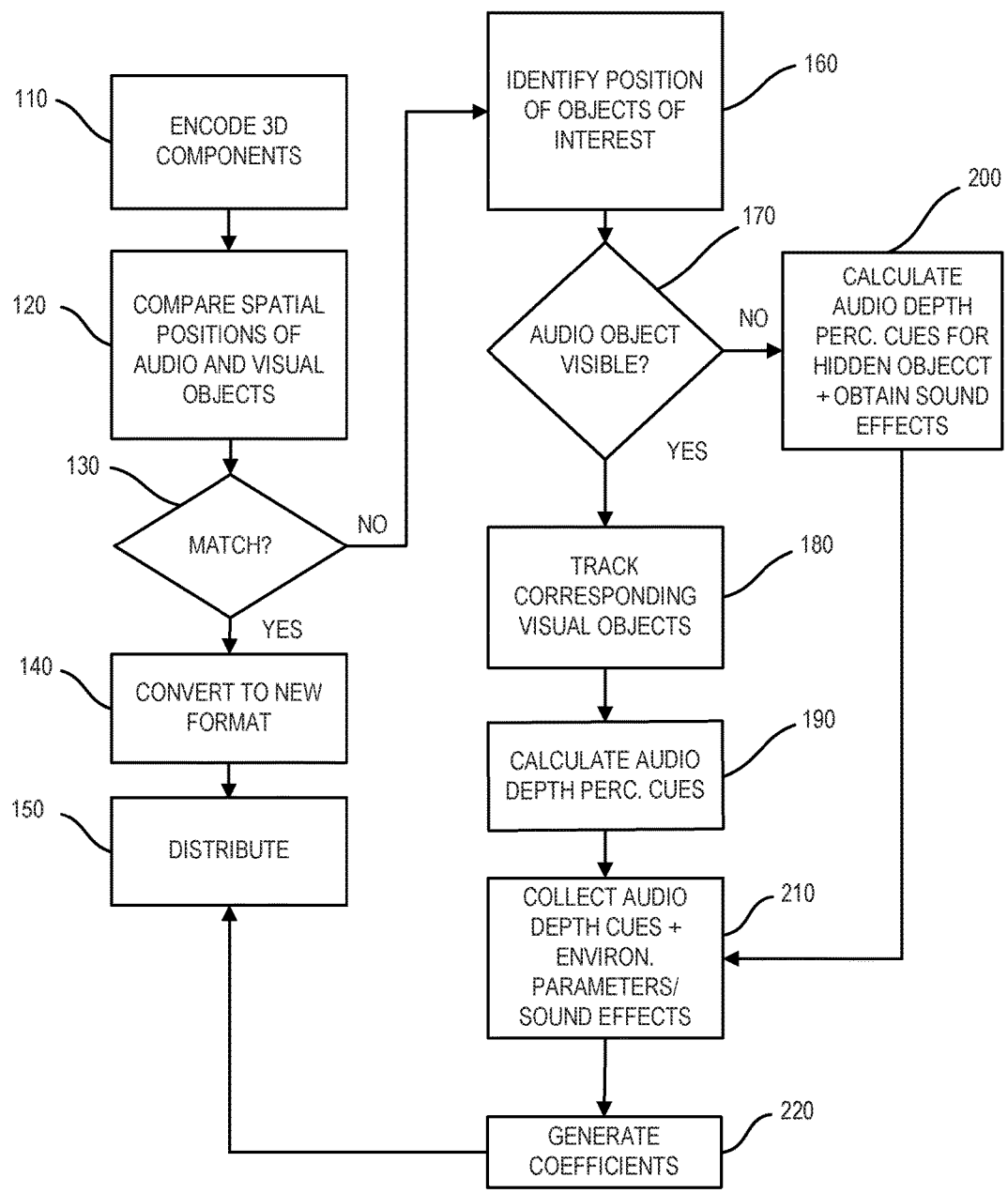
FIG. 5 shows a method of operation of the apparatus of FIG. 1.

FIG. 5 shows a flow chart of an exemplary method used by the apparatus of FIG. 1. As discussed initially, a 3D movie in a known format is received and its audio and video components are encoded in step 110. In step 120 audio and video objects of interest are detected (for example, in a scene). This step can be performed either by an operator or automatically. The spatial positions of these objects are then compared. If they match (step 130) then they are converted into a new format, using an appropriate encoding scheme (step 140) and then distributed (step 150) through an appropriate channel. If there is no match in the spatial positions, or if there is insufficient information to detect the spatial position of an audio object, then in step 160 the spatial positions are identified by audio processor 21.

In step 170, a check is made as to whether an audio object of interest is associated with a visible object. If it is, then in step 180 the positions of the corresponding visual object (actors A, B) are continuously tracked (step 180) and corresponding audio cues are generated (step 190). If an audio object does not correspond to a visual object (for example, actor B in his original position or actor A in position Al) then different calculations are made using specific rules applicable for occluded, off-screen or otherwise hidden objects (step 200). For example, the movement of the hidden object (e.g., an actor moving behind a wall) can be interpolated and used to generate a corresponding audio object. Additional sound effects are also obtained at this point, based on the environmental parameters previously received. In step 210 the audio and visual parameters are provided to the authoring tool 22. For example, the positional cues (in one, two or three dimensions) can be added to the audio components. Alternatively, a separate field is provided with the audio cues presented as an audio 3D position map, table or other convenient form. The new sound effects are also provided to the authoring tool so that the coefficients generated in step 220 also define sound tracks that have been modified in accordance with the respective acoustic environment.

The steps are implemented by the apparatus of FIG. 1 by encoding the audio component with appropriate 3D space audio perception cues. During the initial encoding performed by audio/video encoder 10, various parameters, such as a Z-axis depth map or other indicia for the visual objects of interest, and audio tracks are stored in a log 20. The encoder 10 generates the first 3D encoded content for distribution, storage, recording, etc.

Then, possibly at a future date, content in a different, possibly enhanced, 3D format is desired, which includes 3D audio perception cues. For this purpose, the information from the log 20 is provided to audio processor 21. Alternatively, the first 3D encoded content (or the 3D uncompressed digital master—if still available) is analyzed by analyzer 30 and the resulting 3D tracking map for the visual objects of interest (e.g., a Z-axis depth map) is obtained together with tracking information indicating the positions of audio objects of interest (if available).

The audio processor 21 then uses the information obtained from the log 20 and/or analyzer 30, as well as additional control signals generated manually or automatically and environmental parameters and generates a set of audio parameters defining the positions of various audio objects of interest. These audio parameters are provided to the authoring device 22. The authoring device also receives corresponding video information regarding the positions of visual objects or each frame or groups of frames from video processor 23.

The audio parameters are used by the authoring tool 22 to generate parameters (including 3D position perception cues) defining the way audio objects of interest are perceived in may be processed according to one or more audio object tracking map parameters to add cues such as amplitude differences, phase differences, arrival time differences, reverberant vs. direct sound source level ratios, tonal balance shifts, masking, and/or surround or multi-channel directionality. These parameters are tailored for the audio object(s) of interest to correspond, where editorially appropriate, with the visual objects of interest thereby providing an enhanced the 3D audiovisual experience. Operator controls allow for manual override of the otherwise automatic process so that editorial emphasis or de-emphasis of the audio depth perception cues can be managed as appropriate, i.e., when visual and audio objects of interest do not correspond, or when there is no on-screen audio object of interest at all, e.g. an omniscient, disembodied narrator's voice is delivering important dialog as discussed above.

In the example given above, the various scenes are described as real scenes shot of real actors speaking real dialog. Of course, these scenes need not be based on real action and characters but could be either hybrid real and virtual actions and characters, or purely virtual ones. The term 'virtual actions or characters' is used to describe cartoon characters or other virtual objects or action (both visual and audio) generated animation or by a video game or other similar rendering device.

Figure 6A:
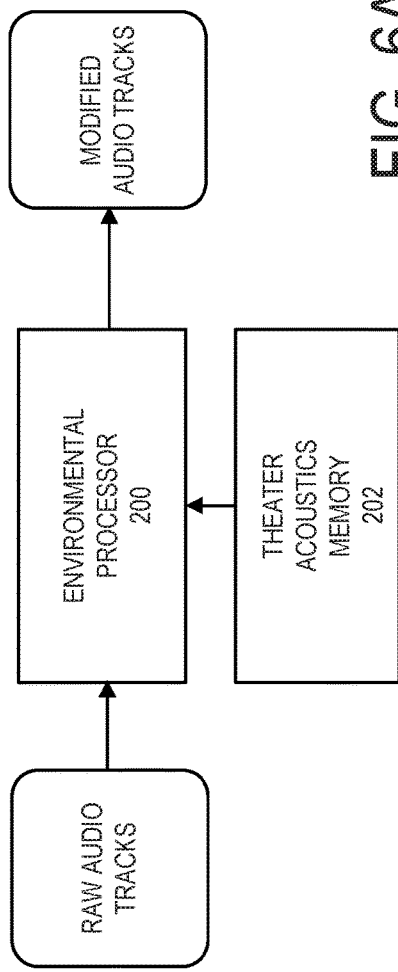
FIGS. 6A, 6B and 6C show elements of the audio signal processor used in the block diagram of FIG. 1 for a 3D presentations, V/R presentations and A/R presentations, respectively.

Importantly, the audio processor may include an environmental processor used to modify the raw audio tracks to account for local environmental elements. In FIG. 6A, an audio processor 21A is shown which includes an environmental processor 200 for handling a 3D presentation in a movie theater. The processor 200 receives local environmental characteristics from a memory holding information about the acoustics of the respective movie theater. The processor 200 analyzes the raw audio tracks and modifies them as necessary to compensate for the acoustics of the theater. For example, a water wall, a whispered conversation or a passing fire truck sound differently to a spectator seated in different theaters, or in different locations within a theater, in either case with reference to the different acoustic environmental characteristics. The environmental processor 200 compensates for this effect so that the spectator will hear a more realistic sound track—i.e. a sound track closer to what the content director originally intended.

Figure 6B:
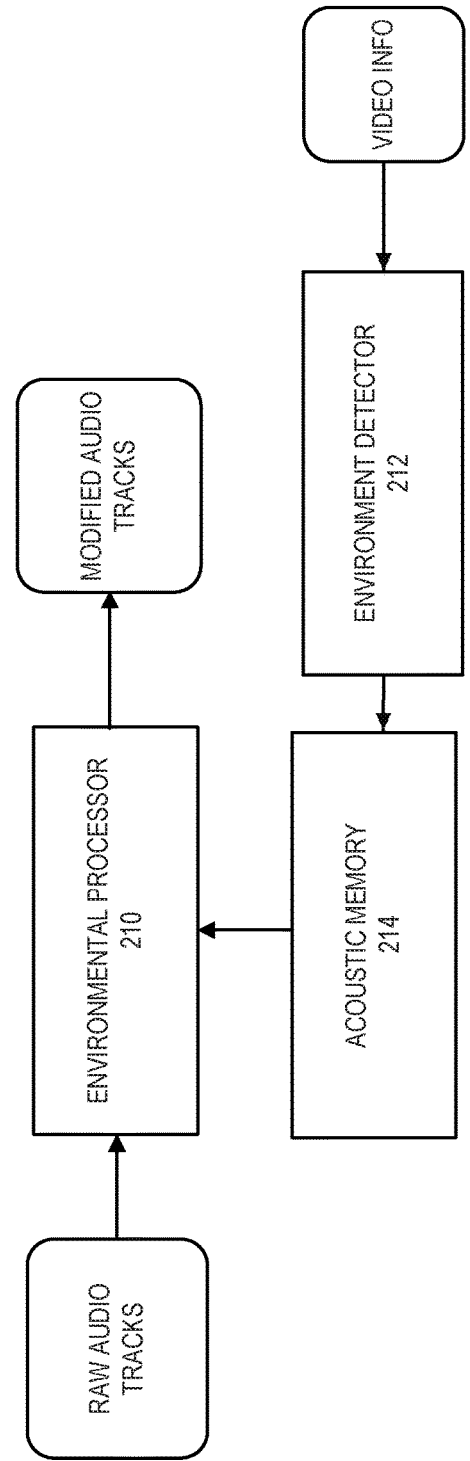

FIG. 6B shows another audio processor 21B designed for a VR presentation. During this presentation, the user is controlling the sequence and the environment of the action from scene to scene. So, for example, in one scene the action may take in an open field, while the next scene may take place in a cave. In order to obtain a realistic effect, audio processor 21B includes an environmental processor 210, a virtual environment detector 212 and an acoustic memory 214. The detector 212 detects the appropriate visual environment for a particular scene based on video information it receives. The video information may be provided by the video processor 23 in FIG. 1. Once the appropriate environment is detected, the appropriate acoustic characteristics for that environment are obtained from acoustic memory 214. The processor 210 then uses this information to modify the raw audio tracks. The resultant parameters include or are representative of the audio depth perception cues discussed above and in FIG. 5 steps 190 and 200.

Figure 6C:
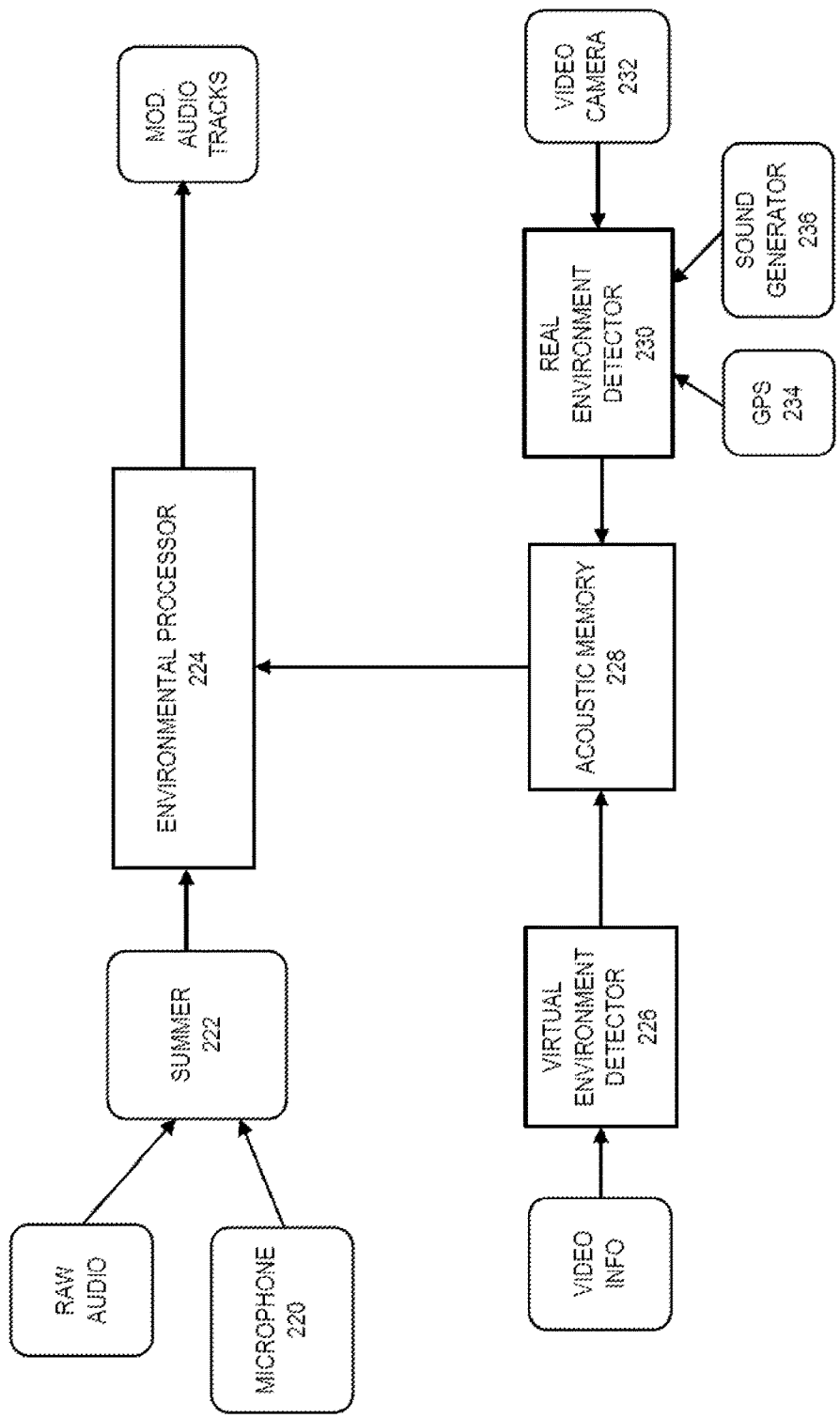

FIG. 6C shows the details of a audio processor 21C for an AR presentation. For this presentation, both the audio and the video information are combined with real audio and video signals from the actual environment of the viewer resulting in the augmented reality. For this purpose, the raw audio tracks are fed to a respective summer 222, Summer 222 also receives real live audio signals from the actual environment of the viewer through a microphone 220. The combined audio tracks are provided to environmental processor 224.

As in FIG. 6B, the virtual video information is provided to virtual environmental detector 226. The environmental detector 226 detects the virtual environement from the video signals and provides this information to acoustic memory 228.

In addition, a real environment detector 230 is used to detect the real environment of the viewer. For this purpose, the detector 230 is connected to a video camera 232. The detector 230 analyzes images from the video camera to determine for example, if the viewer is in a park or his bedroom. This information is provided to the memory 228 so that the proper acoustic characteristics are presented to the processor 224.

Alternatively, instead of a camera 232, a geographic locator such as a GPS 236 is provided to determine the environment of the viewer based on his location.

In yet another alternative, a sound generator 236 is used to generate a sound pattern. The resulting echoes are sensed through either microphone 220 or through another microphone to determine the current environment of the viewer.

It should be understood that the three environmental processors shown in FIGS. 6A, 6B, 6C are preferably combined with the elements discussed above and shown in FIG. 1, 1A, etc.

The authoring tool 22 generates a set of encoder coefficients corresponding to the audio and visual objects for each frame or group of frames.

In one embodiment of the invention, a second audio/video encoder 70 may, but need not, be similar or even identical to encoder 10 as shown in FIG. 1 to receive digital content based on the 3D uncompressed video master 60 in any format including any one of the formats described above. The encoder 70 analyzes the received digital 3D movie and determines its format automatically, or the device can receive user input or some other signal indicative of the format for the received digital 3D content. The encoder 70 also receives information specifying a desired output format, or is preprogrammed to convert the digital 3D content into a corresponding second encoded 3D content in a preselected different format (such as Blu-ray Disc, satellite broadcast, Nintendo 3DS, etc.) The encoder 70 uses a plurality of encoding coefficients stored in a memory 70B for this purpose. Some of the encoding coefficients may be common to several different output formats while others will be unique to each format. Importantly, in accordance with this invention, the content of memory 70B is altered by changing one or more of the predetermined coefficients with the parameters from the authoring tool 22. In some cases, the parameters from the tool 22 may not be compatible with the encoder 70. In this case, the parameters from the tool 22 are first provided to a mapping processing element 24 that maps the parameters into a format that is compatible with encoder 70. The mapped parameters replace some or all of the coefficients in memory 70B.

It should be emphasized that in the above description, the cues for audio depth perception are discussed primarily as being indicative of the 3D position of an audio object of interest, in at least one, or two or all three dimensions, i.e., X, Y and Z.

In one embodiment, the authoring tool 22 not only modifies the audio signals with depth perception cues; it also creates meta data that contains the relevant inverse transforms so that a down-stream signal processor (not shown) can derive the original (or close to the original if the process is lossy), un-optimized digital 3D movie audio stream for 2D viewing. The metadata is stored along with the second encoded 3D content.

In one embodiment of the invention, the format of the second encoded 3D content is very different than the format of the first encoded 3D content, for example in terms of the intended environment. For example, the first encoded 3D content may be formatted for a digital 3D movie distribution channel intended for a 70 ft. theatrical exhibition, while the second encoded 3D content is directed at a Nintendo 3DS 3.5 inch handheld screen. The authoring tool settings are selected accordingly, to conform to different digital 3D movie distribution channels or formats for other systematic reasons. (Details of such a transformation are described in commonly assigned provisional application Ser. No. 61/533,777 filed: Sep. 12, 2011 entitled METHODS FOR CONTROLLING SCENE, CAMERA AND VIEWING PARAMETERS FOR ALTERING PERCEPTION OF 3D IMAGERY; and Ser. No. 61/491,157, Filed: May 28, 2011, entitled METHODS FOR CONTROLLING SCENE, CAMERA AND VIEWING PARAMETERS FOR ALTERING PERCEPTION OF 3D IMAGERY.

Importantly, the positions of the audio objects of interest must be adjusted accordingly.

One skilled in the art will appreciate the fact that while in the embodiment shown in FIG. 1 the second audio/visual encoder 70 receives either the original uncompressed video master or the first 3D encoded content as an input, the invention is not so limited and in fact, the encoder 70 receive any other content as an input and cooperate with appropriate components from FIG. 1 (e.g., analyzer 30, audio and visual processors 21 and 23 and authoring tool 22) to generate a corresponding 3D encoded output having incorporated therein information (either in the form of audio objects, or as cues) indicative of positional information of one or more sounds specific to one or more frames. As described above, this information may be coupled or tied to, or it could be completely independent of the positions of any visual objects of interest.

The present system and method provide for a means of providing an enhanced encoded 3D content efficiently through dynamic processing by identifying or generating audio objects of interest, using information from log 20 or analyzer 30.

Numerous modifications may be made to this invention without departing from its scope as defined in the appended claims.

We claim:

1. An apparatus for generating a presentation from content having original audio and video components, the apparatus comprising:

an environment detector outputting an environment-type signal indicating a detected particular environment;

an acoustics memory having stored therein acoustic characteristics associated with at least one environment, the acoustics memory outputting selected acoustic characteristics indicative of the environment identified by the environment-type signal;

an audio processor receiving said audio components and the selected acoustic characteristics, said audio processor being configured to modify said original audio components into modified audio components based on the selected acoustic characteristics;

an authoring tool receiving said modified audio components and said original video components and generating corresponding encoding coefficients;

and an encoder receiving said original video components and said modified audio components and generating encoded output content based on said encoding coefficients, the presentation comprising the encoded output content.

2. The apparatus of claim 1 wherein said stored acoustic characteristics comprise theater acoustic parameters associated with at least one real theater in which the presentation can be shown.

3. The apparatus of claim 2 further comprising an acoustic environment sensor adapted to sense said real theater acoustic parameters, signals sensed by said acoustic environment sensor being stored in said acoustic memory.

4. The apparatus of claim 1 wherein said encoder is configured to generate VR (virtual reality) encoded content for presentation on a VR device,
wherein said video components define at least a first virtual scene with a virtual environment having virtual acoustic environment characteristics, and
the environment detector being configured to detect the virtual environment of the virtual scene.

5. The apparatus of claim 1
wherein said encoder is configured to generate AR (augmented reality) encoded content based on received content and content obtained from a current environment for presentation on an AR device,
wherein said video components define at least a first AR scene including virtual and real elements and said audio processor is configured to receive virtual and real audio components and acoustic characteristics of said first AR scene,
said audio processor generating coefficients descriptive of audio signals configured to match the acoustic characteristics of said first AR scene.

6. The apparatus of claim 5 wherein said audio processor generates coefficients descriptive of audio signals including environment signals associated with said first AR scene.

7. The apparatus of claim 5, the environment detector comprising a real environment detector detecting a real environment associated with a current position of a viewer and an acoustic environment detector configured to determine acoustic parameters of said real environment.

8. A method for generating a presentation comprising the steps of:
receiving content having original audio and visual components;
receiving an environment-type signal indicating a particular environment;
determining acoustical characteristics indicative of the environment indicated on the environment-type signal;
modifying said original audio components to generate modified audio components based on said acoustical characteristics;
generating encoding coefficients based on at least one of the visual components and the modified audio components; and
encoding said content using the encoding coefficients to generate an encoded output presentation derived from the visual components and the modified audio components.

9. The method of claim 8 further comprising the step of showing the presentation in a theater; the environment comprising said theater.

10. The method of claim 8 wherein said presentation is one of a VR presentation for a viewer using a personal VR device or an AR presentation for a viewer using a personal AR device, the environment comprising a scene in said presentation.

11. The method of claim 10 wherein said step of modifying said audio components includes adding additional sounds, said additional sounds being associated with an acoustic environment associated with said scene, said scene comprising one of virtual scene elements and real scene elements.

12. The apparatus of claim 1, wherein the environment detector is configured to receive a media signal as input and configured to detect an environment of the media signal and indicate the detected environment on the environment-type signal.

13. The apparatus of claim 12 wherein the media signal comprises video components of the presentation; the environment detector being configured to detect the environment shown in the video components.

14. The apparatus of claim 12, further comprising a video camera that produces a video signal showing a physical region within which the camera is located; the environment detector being configured to detect the environment shown in the video signal.

15. The apparatus of claim 12 further comprising a sound generator configured to output an audio pattern within a physical region within which the sound generator is located and a microphone configured to detect sound in the physical region and produce the media signal.

16. The apparatus of claim 12 further comprising a GPS, the environment detector receiving a location signal from the GPS and configured to detect an environment of the location and indicate the detected environment on the environment-type signal.

17. The method of claim 8, further comprising the steps of:
receiving a media signal;
detecting an environment of the media signal; and
indicating the detected environment on the environment-type signal.

18. The method of claim 17 wherein the media signal comprises the video components; the step of detecting comprising detecting the environment shown in the video components.

19. The method of claim 17 further comprising the step of receiving from a video camera a video signal showing a physical region within which the camera is located; the step of detecting comprising detecting the environment shown in the video signal.

20. The method of claim 17 further comprising the steps of:
outputting an audio pattern from a from sound generator in a physical region; and
receiving the media signal via a microphone in the physical region;
the media signal comprising echoes of the audio pattern within the physical region.

21. The method of claim 17 further comprising the steps of:
receiving a location signal;
the step of detecting comprising detecting an environment of the location.

* * * * *